US006645342B2

(12) United States Patent
Scott

(10) Patent No.: US 6,645,342 B2
(45) Date of Patent: Nov. 11, 2003

(54) PULL STRIP FOR FORMING HOLES

(76) Inventor: William M. Scott, P.O. Box 998, Fort Worth, TX (US) 76101

(*) Notice: Subject to any disclaimer, the term of this patent is extended or adjusted under 35 U.S.C. 154(b) by 0 days.

(21) Appl. No.: 10/094,286

(22) Filed: Mar. 8, 2002

(65) Prior Publication Data

US 2003/0168167 A1 Sep. 11, 2003

(51) Int. Cl.[7] .................................... B32B 35/00
(52) U.S. Cl. ........................ 156/344; 156/71; 264/313; 264/318; 264/334
(58) Field of Search .................. 156/71, 344; 264/313, 264/318, 334

(56) References Cited

U.S. PATENT DOCUMENTS

| | | | | | |
|---|---|---|---|---|---|
| 2,635,292 | A | * | 4/1953 | Campbell et al. | 264/334 |
| 3,061,888 | A | * | 11/1962 | Wadham | 264/437 |
| 3,562,820 | A | | 2/1971 | Braun | |
| 3,993,078 | A | | 11/1976 | Bergentz et al. | |
| 4,503,569 | A | | 3/1985 | Dotter | |
| 5,005,331 | A | | 4/1991 | Shaw et al. | |
| 5,152,948 | A | * | 10/1992 | Lizenby | 264/242 |
| 5,368,792 | A | * | 11/1994 | Short et al. | 264/36.15 |
| 5,514,176 | A | | 5/1996 | Bosley, Jr. | |
| 5,678,952 | A | | 10/1997 | Shaw et al. | |
| 6,426,030 | B1 | * | 7/2002 | Julian | 264/318 |

OTHER PUBLICATIONS

Greenstreak Speed Dowel brochure.

* cited by examiner

*Primary Examiner*—Mark A. Osele
(74) *Attorney, Agent, or Firm*—Arthur F. Zobal; Geoffrey A. Mantooth

(57) ABSTRACT

The device is formed of a strand of flexible material that is helically coiled in the form of a preformed elongated member having adjacent coils removably bonded together. In using the device, the preformed member is embedded in concrete when in a wet state with one end of the preformed member extending at or close to the surface of the concrete. After the concrete has solidified, the end of the preformed member is pulled to break the bonds between adjacent coils to lengthen and reduce the diameter of the member to allow the strand to be removed from the concrete to form an aperture in the concrete from the surface.

4 Claims, 3 Drawing Sheets

PULL STRIP FOR FORMING HOLES

BACKGROUND OF THE INVENTION

1. Field of the Invention

The invention relates to a device and method for forming holes in new structures such as concrete.

2. Description of the Prior Art

In many construction projects formed of concrete, holes must be drilled into the concrete for receiving rebar for allowing the attachment of other structures to the concrete. The drilling procedure requires expensive drilling equipment and is time consuming.

SUMMARY OF THE INVENTION

It is an object of the invention for providing a new and useful device for use for forming holes in new concrete structures without any drilling required.

It is a further object of the invention to provide a new and process for forming holes in new concrete structures without any drilling required.

The device comprises a strand of flexible material that is coiled in the form of a preformed elongated member having adjacent coils removably bonded together.

In using the device, the preformed member is embedded in concrete in the uncured state is poured with one end of the preformed member extending at or close to the surface of the concrete. After the concrete has solidified, the end of the preformed member is pulled to break the bonds between adjacent coils to lengthen and reduce the cross-section of the device to allow the strand to be removed from the concrete to form an aperture in the concrete from the surface.

In one embodiment, the preformed member is embedded in the concrete by mounting the preformed member in a stationary position and pouring the concrete around the member. In another embodiment, the preformed member is embedded in the concrete by pushing the member into the wet concrete.

In a further aspect, the coiled strand is formed of a suitable plastic material and the end to be located at or near the surface has a cap coupled thereto partially covering the center aperture of the coiled strand.

In another aspect, gripping means is coupled to the cap to facilitate removal of the coiled strand from the concrete.

DESCRIPTION OF THE PREFERRED EMBODIMENTS

Figure 1:
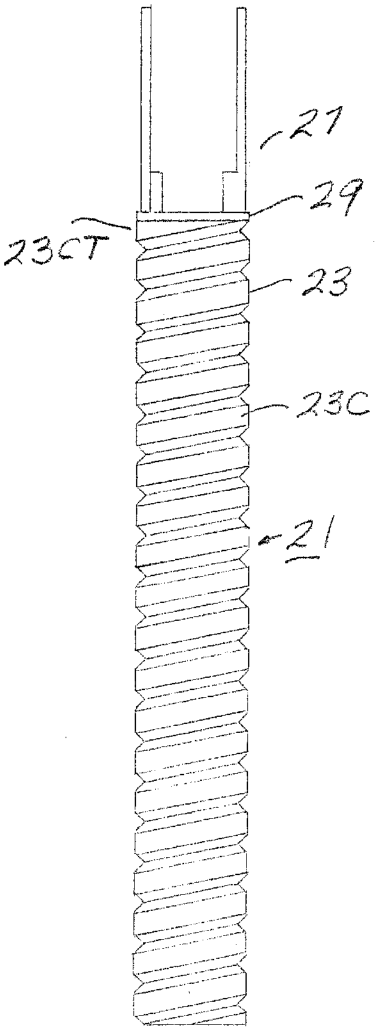
FIG. 1 is a side view of the coiled pull strip or strand of the invention with adjacent coils bonded together.

Referring now to FIGS. 1–4 and 6–10 of the drawings, the device of the invention is identified at 21. It comprises a strand or strip of plastic material 23 helically coiled to form the elongated member 21 having a given length and a given outside diameter when its coils are bonded together. In this state, adjacent coils 23C of all of the coils are weakly or removably bonded together by a thin layer of plastic material 25. The top 27 of the member 25 has a cap 29 bonded to the top coil 23CT with a small circular opening 29A formed therethrough. From the cap to the bottom coil 23CB, a central aperture 31 extends from the cap 29 through the bottom coil 23CB. Gripping strips 33S and 33B extend outward from the cap 29.

Figure 5:
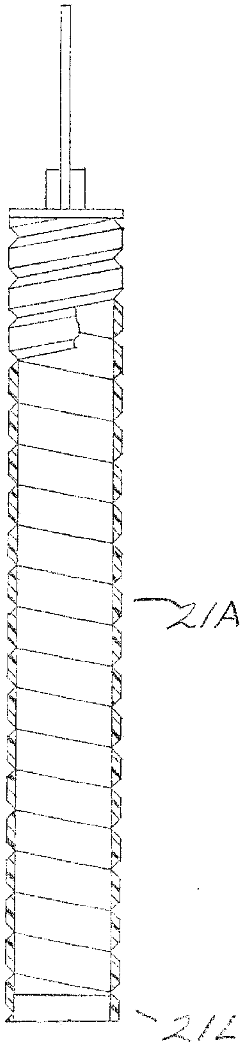
FIG. 5 is a modification of the coiled strand of FIGS. 1–4.
Figure 3:
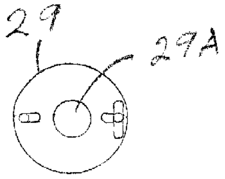
FIG. 3 is a top end view of the coiled strand of FIGS. 1 and 2.
Figure 4:
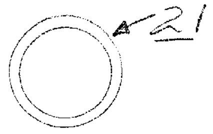
FIG. 4 is a bottom end view of the coiled strand of FIGS. 1 and 2.
Figure 6:
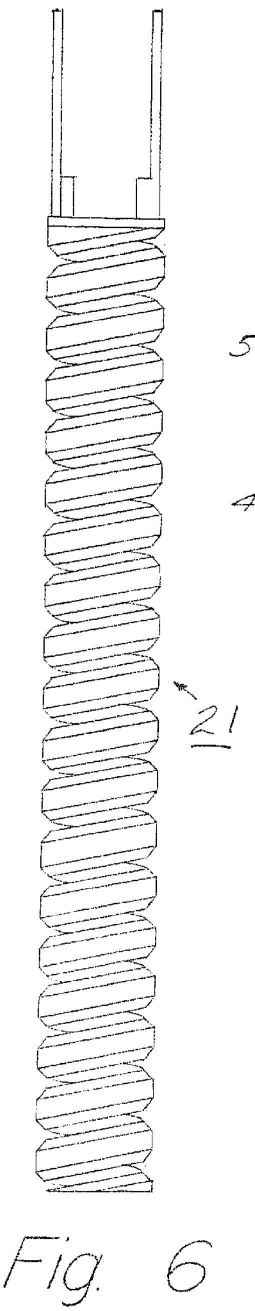
FIG. 6 illustrates the coiled strand of FIGS. 1 and 2 lengthened by pulling the strand in one direction breaking the bonds between adjacent coils.
Figure 10:
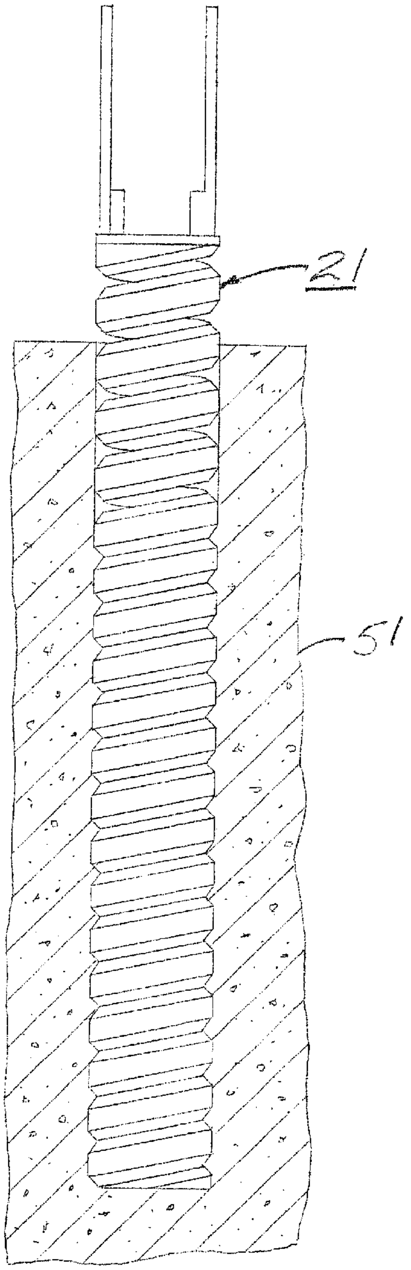
FIG. 10 illustrates a coiled strand of the invention being pulled from a solidified concrete structure to form a hole therein.

By holding the device 21 at its lower end and pulling on the gripping strips 33A and 33B the bonds 25 are broken such that adjacent coils 23C are pulled apart to lengthen the device 21 and reduce its outside diameter as shown at in FIGS. 5 and 10.

Figure 2:
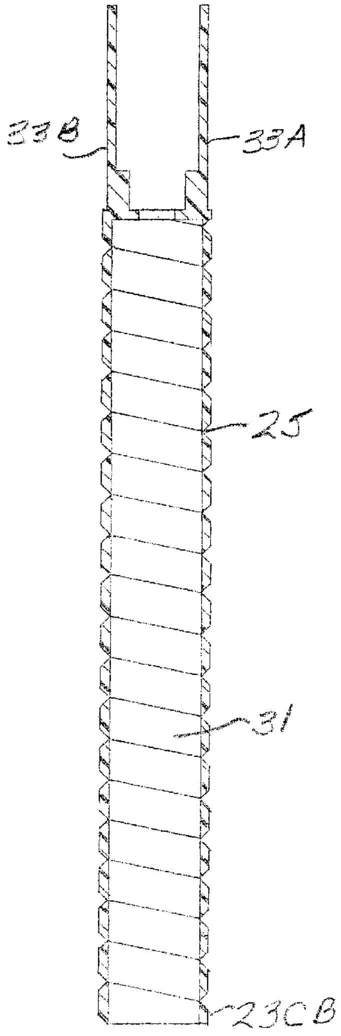
FIG. 2 is a cross-section of the coiled stand of FIG. 2.
Figure 7:
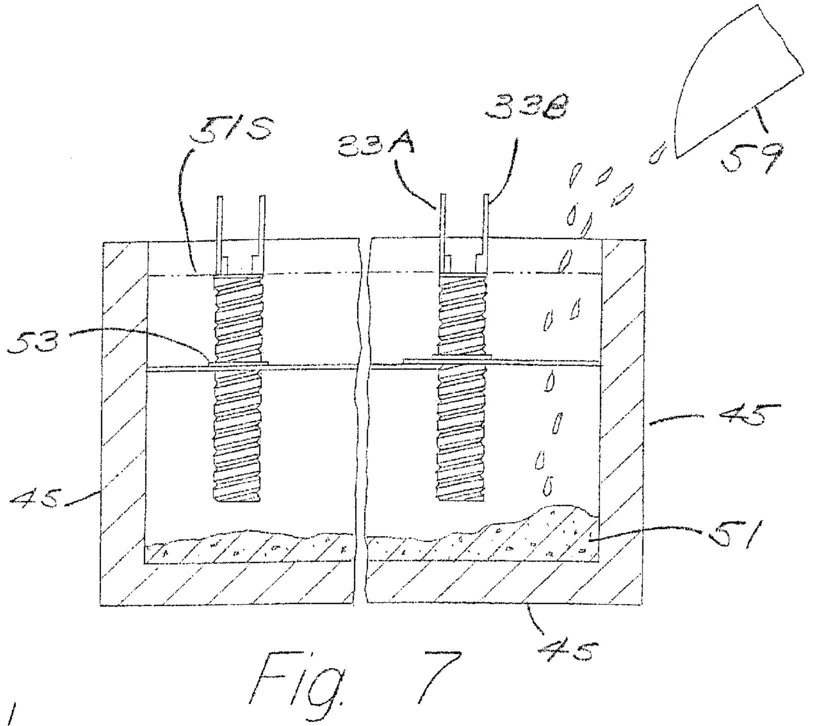
FIG. 7 illustrates two of the coiled strands of FIG. 1 connected to reinforcing wire or rods in a trough for receiving concrete.
Figure 8:
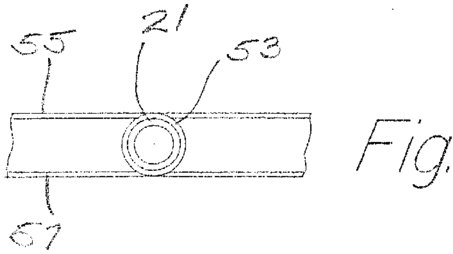
FIG. 8 is a top plan view of one of the coiled strands of FIG. 7 held in place.
Figure 9:
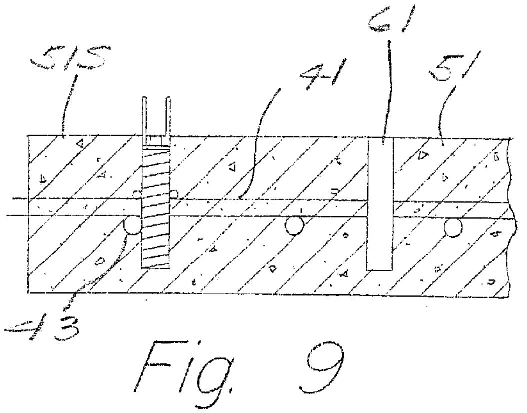
FIG. 9 illustrates a coiled strand on the left embedded in solidified concrete poured to form a desired structure and a hole formed on the right of the poured concrete after the strand has been pulled out of the concrete.

Referring to FIGS. 7–9 the device of FIGS. 1 and 2 is used one embodiment in the following manner. In FIGS. 7 and 8, members 41 and 43 are reinforcing metal wires or members secured in a zone defined by walls 45 to support concrete 51 poured in the zone to form a desired structure such as a roadway for supporting or guiding the wheels of passenger carrying vehicles. A plurality of the devices 21 are located in ring shaped metal members 53 and held in place by wires 55 and 57 (attached to the walls 47) in positions where the holes are desired in the concrete structure to be poured. The concrete 51 in a wet state is poured from device 59 in the zone surrounding the devices 21 with their top cap 29 located near or at the surface 51S of the concrete with their gripping strips 33A and 33B extending upward above the upper surface 51S of the concrete. After the concrete 51 has cured or dried and solidified, the devices 21 are pulled out of the concrete leaving apertures in the concrete, one of which is shown at 61. The devices 21 are pulled out of the solidified concrete by pulling upward on the strips 33A and 33B. As shown in FIG. 9. This causes the thin bonds 25 to break such that adjacent coils 23C are pulled apart lengthening the device 21 and reducing its outside diameter allowing it to be readily pulled out of the solidified concrete leaving the hole 61. Metal rebars may be bonded into the holes 61 such that concrete tracks may be poured on the upper surface 55S of the concrete and held in place by the rebars.

Although the invention is employed to form holes in new concrete, it is to be understood that it could be used to form holes in other type of materials that solidifies from an uncured state to a cured state.

In one embodiment, the device 21 is formed of polyethylene. It may have a length of 5 inches and an outside diameter of ⅝ of an inch in an unstretched state. The maximum wall thickness of each coil of the device 21 is about 1/16 of an inch. It is to be understood that these dimensions may vary.

Figure 11:
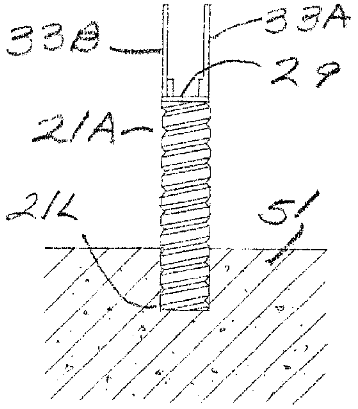
FIGS. 11 and 12 illustrate the modified coiled strand of FIG. 5 being pushed into wet concrete to locate it in the position as shown in FIG. 12.
Figure 12:
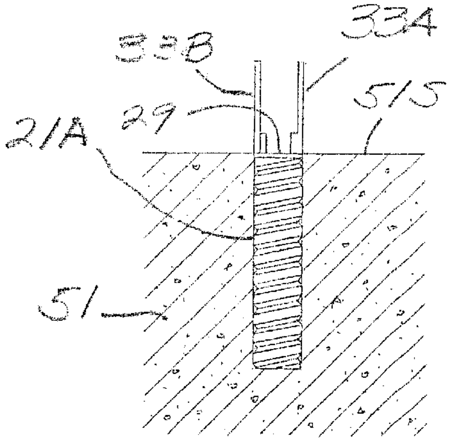

Referring to FIGS. 5 and 11 and 12, the device of FIGS. 1 and 2 is modified to form the device 21A which is the same as device 21 except a plug 71 is inserted and attached in the lower end of the aperture 31 to plug the aperture 31 at the lower end 21L at coil 23CB. The device 21A is embedded into wet concrete 51 by pushing the lower end 21L of the device 21A into the wet concrete 51 until its cap 29 is located at the surface 51S of the wet concrete 51 as shown in FIGS. 11 and 12. When the concrete 51 has solidified and hardened, the device 21A is pulled out of the concrete 51 in the same manner as device 21 is pulled out of the concrete as described in connection with FIGS. 1–4 and 6–10 to form a hole 61 in the concrete.

In one embodiment, the plug 71 may be a suitable plastic or elastomer that is bonded inside of the aperture 31 at the lower end 21L of the device 21A.

What is claimed is:

1. A method of forming an aperture into structure formed from unsolidified material that is capable of solidifying to a hard state comprising the steps of:

embedding an elongated preformed member having two opposite ends, in said unsolidified material with one of said ends located close to a surface of said material, said preformed member comprises a strand of flexible material that is helically coiled and has adjacent coils which are removably bonded together and having a given outside diameter, after said material solidifies, pulling said one end of said strand to separate the bonds between adjacent coils of said strand to remove said strand from said solidified material to form an aperture in said solidified material from said surface.

2. The method of claim 1, wherein:

said preformed member is embedded in said material when in an unsolidified state by pushing the other of said ends of said preformed member into said unsolidified material until said one end of said preformed member is located close to said surface of said material.

3. The method of claim 1, wherein:

said preformed member is embedded in said material when in an unsolidified state by attaching said preformed member to a support member, and placing said unsolidified material around said preformed member with said one end located close to said surface of said material.

4. The method of claim 1, wherein:

said material of said structure comprises concrete.

* * * * *